July 19, 1938.  S. MEZZAPESA  2,124,308
DEVICE FOR INSTANTANEOUSLY COOLING BEER AND DISPENSING SAME
Filed Jan. 2, 1936
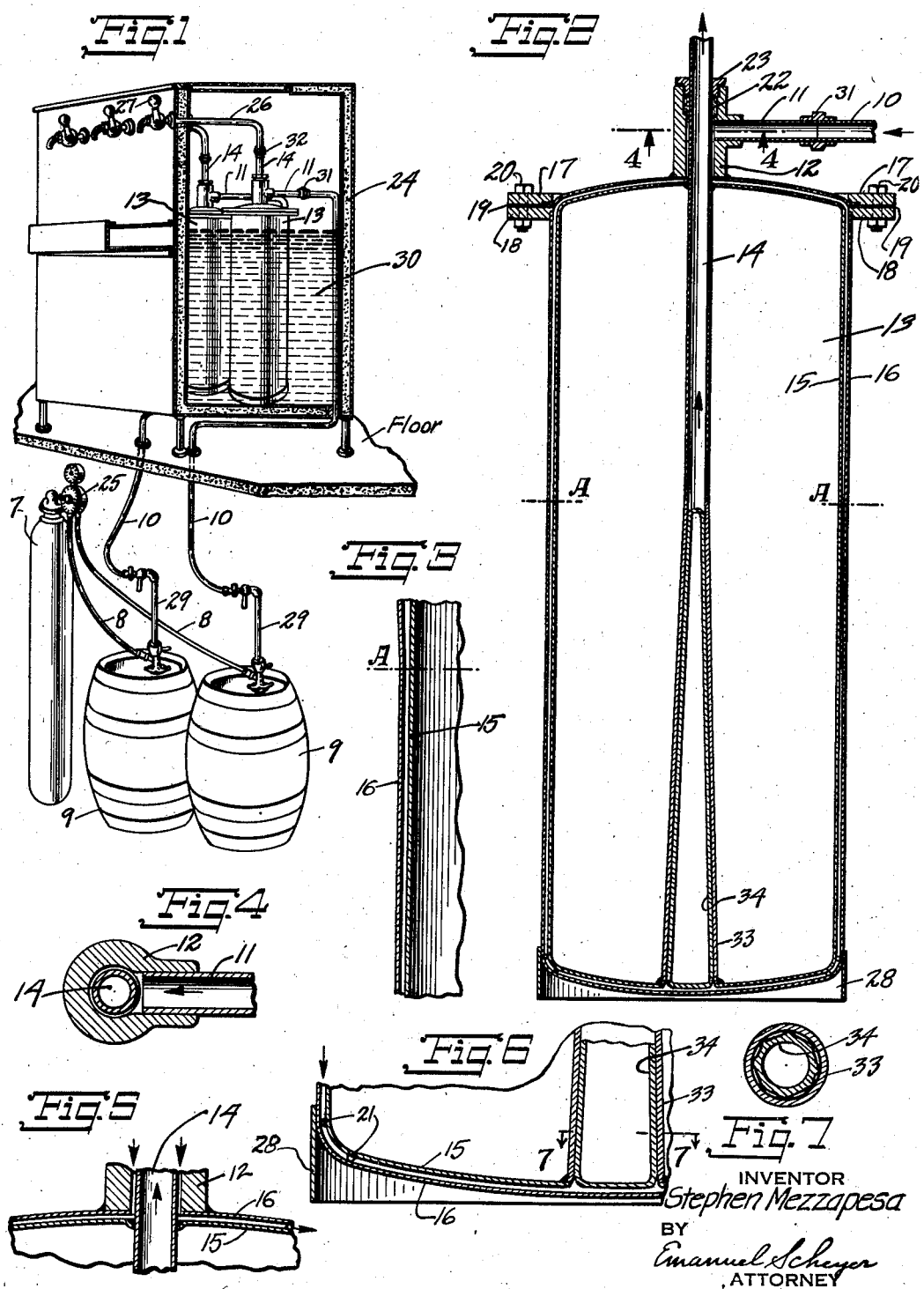
INVENTOR
Stephen Mezzapesa
BY
Emanuel Scheyer
ATTORNEY Patented July 19, 1938

2,124,308

UNITED STATES PATENT OFFICE 2,124,308

DEVICE FOR INSTANTANEOUSLY COOLING BEER AND DISPENSING SAME

Stephen Mezzapesa, Brooklyn, N. Y.

Application January 2, 1936, Serial No. 57,111

4 Claims. (Cl. 225—1)

This invention relates to a device for dispensing beer which prevents excessive quantities of foam and gas from being discharged at the faucet.

Although the description and claims herein specify beer, I wish it to be understood that the invention applies also to other liquids charged with gas, especially carbon dioxide gas.

It is a defect of present systems and methods of dispensing, that when the faucet is first opened there is often a squirt of gas and foam spattering the beer and wasting it. The excess foam filling the glass held under the faucet must be removed and displaced by beer, causing a waste of the beer forming the foam. Also the gas lost this way tends to leave the remaining beer flat. Some of the present systems have relief valves for the gas, to obviate the above noted defect. This also tends to leave the dispensed beer flat.

My invention consists in a device for forcing the beer from the storage receptacle or barrel into a thin sheet by passing it between closely spaced walls and then causing the beer after it has passed between the walls to pass through an exceedingly fine orifice from whence it passes through a length of the standard size beer tubing to its place of discharge at the faucet. Experiment has shown that this causes the undissolved gas or air in the system to be evenly distributed throughout the discharged liquid in small bubbles. It breaks up the large bubbles into small ones, and reduces the foam to liquid. It permits the use of greatly increased pressure with the resultant solution of more gas in the beer, giving rise to a more zestful and tangy beer. The closeness of the walls is such that the force of capillarity is brought into play to help reduce the foam. There is also a straining action obtained by the closeness of the walls, and smallness of the orifice largely preventing the foam which leaves the storage receptacle or barrel with the beer from passing through the space between the walls to the place of discharge.

At the place where the beer is formed into a thin sheet it is preferably passed through a refrigerating medium, the thinness of the sheet effecting a rapid and thorough cooling of the beer. The cooling at this location further helps the reduction of foam and the elimination of large bubbles by the increased solubility of the gas in the colder beer.

My cooling and foam eliminating unit is composed of two vessels one within the other with a space between them through which the beer is forced. By removing the inner vessel, the outer face of its walls can be easily cleaned as well as the inner face of the walls of the outer container, whereby the space between the containers can easily be kept clean.

Other objects and advantages will become apparent upon further study of the description and drawing in which:—

Fig. 1 is a perspective partial view of a beer dispensing system with a portion of the beer cooler broken away to show the units within.

Fig. 2 is a cross-section of the beer cooler unit.

Fig. 3 is an enlarged section through the walls of the cooler unit for the portion near a line A in Fig. 2, showing the tapering of the space between the walls.

Fig. 4 is a partial section, to an enlarged scale, taken along the line 4—4 of Fig. 2.

Fig. 5 is a partial section, to an enlarged scale, through the top walls of the cooler unit.

Fig. 6 is a partial section, to an enlarged scale, of the bottom walls of the unit, and Fig. 7 is a cross-section through the orifice taken along the line 7—7 of Fig. 6.

The particular beer dispensing system shown in the drawing has a tank 7 of carbon dioxid gas with a tube 8 leading into the top of each barrel 9. As is well known to the art, a tube 29 leads from some point near the bottom of each barrel and is connected to a tube 10 for each barrel. Each tube 10 is connected to a short piece of tubing 11 at each unit 13; said tubing entering sleeve 12 and connecting with the annular space between said sleeve and the outside of tube 14.

Each unit 13 comprises an inner vessel 15 and an outer vessel 16. Tube 14 runs through inner vessel 15 and is hermetically soldered or otherwise fastened at its flared out portion 33 to the bottom wall of said vessel at an opening therethrough. Tube 14 extends through the upper wall of vessel 15 and is likewise sealed and fastened thereto. Tube 14 also extends through the upper wall of vessel 16. Said upper wall is removable. It has a ring 17 fastened to it. The upper end of the sidewall of vessel 16 has a corresponding ring 18 fastened to it. Between the two rings is located a gasket 19. The two rings are fastened together by bolts 20. Rings 17 and 18 ensure the proper spacing between the vessels at their upper ends. The proper spacing of the vessels at their lower ends is maintained by a series of small balls 21 soldered to inner vessel 15. Only two such balls are seen in Fig. 6, but there are others at intervals around the space at the bottom of the vessels. A flange 28 is provided at the bottom of vessel 16 as a base for the unit.

Sleeve 12 is hermetically soldered and sealed to the top of the top wall of vessel 16 at an opening. The upper end of sleeve 12 is counterbored and tapped to provide a gland for packing 22, which is held in place by gland nut 23.

Inner vessel 15 is removed from outer vessel 16 when it is desired to clean the space between them. This is easily done by removing bolts 20 and undoing couplings 31 and 32, enabling the top wall of vessel 16 to be removed. When said top wall is removed, vessel 15 can be lifted out of vessel 16.

Referring now to Figs. 2 and 3, it will be observed that the space between the walls below lines A is less than it is above. Below lines A the walls are parallel, but above they begin to separate reaching a maximum spacing at the top of the vessels. It is preferred to have the width of the parallel space substantially one-half of the width of the space at the top of the vessels. The parallel space is preferably from one sixty-fourth to one thirty-second of an inch.

The lower portion of tube 14 is provided with a conoidal flare 33. Fitting inside of flare 33 is a substantially frustro-conoidal plug 34, its outer surface being slightly fluted. The fluting is provided so that there are channels for the beer to flow between plug 34 and flare 33. These channels are very fine, in fact barely perceptible, so that only a very small quantity of beer can flow past the plug with the beer under a pressure as high as thirty pounds per square inch. Just enough beer flows through the system at this pressure so that it will slowly fill an ordinary beer glass, say in about two seconds. Instead of having plug 34 fluted, its outer surface may be slightly elliptical in cross-section so that it does not have quite a perfect fit inside of flare 33. Plug 34 has a forced fit in said flare.

Besides requiring a substantial length for the walls of the container, in the direction of flow of the beer passing through the space between them, for providing sufficient opportunity for reducing the foam entering said space, said length is required to give sufficient opportunity for the cooling action of the refrigerant 30.

In effect the unit is a double walled container with a very narrow space between the walls through which the beer is caused to flow as a thin sheet. As is the practice in the art, the cooling units 13 are immersed in ice water 30 or surrounded by other refrigerants in tank 24. The thinness of the beer sheet is very conducive to its rapid and complete cooling.

In operation, gas from tank 7 passes through tube 8 into a barrel 9 and causes downward pressure on top of the beer in the barrel. As is well known in the art, the pressure of the gas supply is controlled by a pressure regulator 25 carried by tank 7. The beer leaves the barrel by tube 10 and passes through tubing 11 into the annular space between sleeve 12 and tube 14. From said space, the beer spreads in a thin sheet into the space between the upper walls of vessels 15 and 16, passing down between the side walls, said sheet being thinned down as it travels to the narrower parallel space below line A. After passing through the narrower space, the sheet continues on between the bottom walls of the vessels where it enters the greatly restricted orifice between flare 33 and plug 34. While there may be several small channels for the flow between flare 33 and plug 34, these channels taken together are termed an orifice. After passing through said orifice, the beer passes on up through tube 14, out said tube to pipe 26 and faucet 27. The inside diameter of tube 14 is preferably three-eighths of an inch, the standard size used for the block tin tubing in beer apparatus.

The narrowness of the space between the walls of vessels 15 and 16 and the smallness of the orifice formed by flare 33 and plug 34, requires a relatively high pressure to force the beer through the system, with the resultant solution of more gas in the beer. The smallness of the orifice keeps back the pressure from reaching the faucet when the latter is open. Of course with the faucet closed, the pressure in the system reaches the faucet, but the instant the faucet is opened, the pressure becomes very small between the orifice and the faucet. In the latter location, when the faucet is opened, the beer has what is known in hydraulics as a stream line flow, that is a flow without turbulence. Such a flow occurs when the velocity of the liquid is very low. The same quantity of beer per second must pass through pipe 14 as through the very restricted orifice. As the orifice allows only a small quantity to pass through it per second, this same quantity in passing through tube 14, which is much larger in cross sectional area than the orifice, will require a very low velocity of flow in said tube. Whatever bubbles may form after the pressure is relieved when the beer has passed through the orifice will be small and evenly distributed.

As the beer enters tubing 11 and the space between the upper walls, it is most likely full of large bubbled foam. Or there may be intervals of liquid separated by intervals of undissolved gas and foam. The space between the walls acts as a strainer holding back a large proportion of the foam. As the mixture continues on through the space between the walls, the gas is forced back into the liquid in the form of small bubbles and substantially evenly distributed therethrough, the remaining foam being reduced to liquid or at best, remaining only as tiny bubbles. The gas and foam is still more effectively forced back at the still more narrowed space below lines A and at the orifice. After the beer has passed the orifice it expands into the larger space of tube 14 but without the formation of large bubbles. Once the large bubbles are eliminated they will not reform unless the liquid is unduly disturbed. The beer passing up tube 14 has the gas evenly distributed through it without large bubbles and foam and with all the original gas in it, so that when it passes out faucet 27 it is not flat and yet flows evenly without squirts of gas and foam. The beer when thus dispensed into a glass gives rise to a collar of foam of small bubbles and creamy.

The small space between the walls subjects the beer passing through to capillary force. It gives the sheet of beer what amounts to tensile strength, so that when a bubble occurs between the walls, the surfaces of the liquid at the top and bottom of the bubble, due to capillarity, tend to be drawn together and help to eliminate the bubble or break it up into smaller ones. The best results are obtained with the capillary force when the walls are not spaced farther apart than will give rise to a meniscus on a free surface of beer held between the walls. As is well known in physics, the meniscus is the concave surface of the liquid in a capillary tube or between two closely spaced surfaces. It is the surface tension along the meniscus, which tries to pull it out flat, combined with the cohesion of the particles of liquid beyond it that helps destroy large bubbles or prevents their formation. When the walls are more than a certain distance apart for a given liquid, no meniscus is formed, the surface of the liquid being flat except near the walls.

The system illustrated herein shows a carbon dioxid tank for supplying the pressure. The well known beer pump supplying air under pressure could be used instead.

The terms top, side and bottom walls are used in the claims for simplicity. These walls could just as well be in relatively interchanged positions and the claims are intended to be broad enough for this.

I claim:—

1. A unit for use in a beer dispensing system having a storage receptacle for holding beer in it under pressure, said system also having an outlet device for discharging the beer from the system, said unit comprising an outer container and an inner container, each of said containers having top, side and bottom walls, walls of the inner container being spaced a small distance inside of walls of the outer container defining a narrow channel between them for the passage therethrough of the beer, said channel being sufficiently narrow to eliminate substantially the foam from the beer passed through it on its way from the receptacle to the outlet device, and a tube passing down through the top walls of the outer and inner containers, through the inner container to its bottom wall, said tube being hermetically sealed to said bottom wall at an opening in said latter wall, the top wall of the inner container being hermetically sealed to the tube where it passes through, the top wall of the outer container having an opening about the tube larger than the tube, for beer from the receptacle to pass through said latter opening into the channel between the containers, the beer entering the bottom of the tube from the channel and passing out the top of the tube to the outlet device.

2. A unit for cooling beer and eliminating foam therefrom for use in a beer dispensing system having a storage receptacle for holding beer under pressure, said system also having a cooling chamber and a faucet for discharging the beer from the system, said unit being located in the cooling chamber and having closely spaced walls defining a narrow channel between them for the passage therethrough of the beer from the storage receptacle, said channel being sufficiently narrow to eliminate substantially the foam, a tube for leading the beer from the channel to the faucet, said tube extending to the faucet and having a tapering flare, the wide portion of the flare joining said channel, and a tapered plug tight in said flare, with an extremely small space between the plug and the flare for the flow of beer past the plug, said tube conducting the beer, that passes the plug, to the faucet in a stream line flow.

3. A unit for use in a beer dispensing system having a storage receptacle for holding beer in it under pressure, said system also having a faucet for discharging the beer from the system, said unit comprising an outer container and an inner container, each of said containers having top, side and bottom walls, walls of the inner container being spaced a small distance inside of walls of the outer container defining a narrow channel between them for the passage therethrough of the beer, said channel being sufficiently narrow to eliminate substantially the foam from the beer passed through it on its way from the receptacle to the outlet device, and a tube passing down through the top walls of the outer and inner containers, through the inner container to its bottom wall, the bottom portion of said tube having a tapered flare, the wider portion of the flare being at the bottom of the tube, the bottom of the tube being hermetically sealed to the bottom wall of the inner container at an opening in said bottom wall, the top wall of the inner container being hermetically sealed to the tube where it passes through on its way to the faucet, the outer container having an opening in its upper portion for beer from the receptacle to pass through into the channel between the containers, the beer entering the bottom of the tube from the channel and passing out the top of the tube to the faucet, and a tapered plug tight in said flare, with an extremely small space between the plug and the flare for the flow of beer past the plug, said tube conducting the beer, that passes the plug, to the faucet in a stream line flow.

4. A unit for use in a beer dispensing system having a storage receptacle for holding beer in it under pressure, said system also having an outlet device for discharging the beer from the system, said unit having a pair of walls separated from each other to provide a space for the beer to flow between them, means for connecting the unit with the storage receptacle for the entrance of the beer to said space, and means for connecting the unit with the outlet device for the flow of the beer out of said space, said walls being close together to eliminate foam from the beer passing between them, said walls being spaced substantially closer together at a substantial distance away from where the beer enters the space between them, than at the place where the beer enters, the spacing of the walls tapering down from their wider spacing to their narrower spacing.

STEPHEN MEZZAPESA.